United States Patent

Dames et al.

Patent Number: 6,054,924
Date of Patent: *Apr. 25, 2000

[54] MAGNETIC MARKERS

[75] Inventors: Andrew Nicholas Dames; Michael David Crossfield, both of Cambridge, United Kingdom

[73] Assignee: Flying Null Limited, Cambridgeshire, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,762

[22] Filed: Sep. 24, 1997

[30] Foreign Application Priority Data

Sep. 24, 1996 [GB] United Kingdom ............ 9619896

[51] Int. Cl.[7] ........................................ G08B 13/14

[52] U.S. Cl. .................... 340/572.6; 360/572.3; 360/551

[58] Field of Search .................. 340/551, 572.6, 340/572.1, 572.2, 572.3, 572.5

[56] References Cited

U.S. PATENT DOCUMENTS

| | | | |
|---|---|---|---|
| 4,622,543 | 11/1986 | Anderson, III et al. | 340/572.1 |
| 4,935,724 | 6/1990 | Smith | 340/551 |
| 4,940,966 | 7/1990 | Pettigrew et al. | 340/551 |
| 5,010,320 | 4/1991 | Cordery | 340/551 |
| 5,401,584 | 3/1995 | Minasy et al. | 428/611 |
| 5,554,974 | 9/1996 | Brady et al. | 340/572.6 |
| 5,563,583 | 10/1996 | Brady et al. | 340/572.2 |
| 5,576,693 | 11/1996 | Tyren et al. | 340/572.4 |
| 5,736,929 | 4/1998 | Schrott et al. | 340/572.1 |
| 5,847,650 | 12/1998 | Zhou et al. | 340/572.6 |

Primary Examiner—Jeffrey A. Hofsass
Attorney, Agent, or Firm—Browdy and Neimark

[57] ABSTRACT

An improved EAS tag is disclosed. The tag is characterised in that the or one of the magnetic materials on the tag is divided into distinct zones such that the zones and their relative positions can represent information or a code which is readable magnetically by passing the tag through a magnetic field which comprises a relatively small region of zero magnetic field (a magnetic null) contiguous with regions where the magnetic field is sufficient to saturate said magnetic material, the tag being moved through the magnetic field and its magnetic response being detected as it traverses the magnetic null.

11 Claims, 1 Drawing Sheet

MAGNETIC MARKERS

This invention relates to magnetic markers and, more particularly but not exclusively, is concerned with EAS (electronic article surveillance) markers. It should be understood that the terms "tag", "label" and "marker" are used herein interchangeably; such devices may be used in many different applications and, depending on the magnetic properties of the device, may serve to denote (a) the mere presence of the tag (and hence that of an article to which the tag is attached); or (b) the identity of the tag (and hence that of an article to which it is attached); or it may serve to define the precise position of the tag with respect to predetermined co-ordinates (and hence that of an article to which it is attached); or it may serve to provide access codes (e.g. for an inventory system) or generally to provide discrimination between one article or set of articles from other articles.

PRIOR ART

There are a number of passive data tag systems currently available. The most widely-used is based on optically-read printed patterns of lines, popularly known as barcodes. The tag element of such systems is very low-cost, being typically just ink and paper. The readers are also relatively low cost, typically employing scanning laser beams. For many major applications the only real drawback to barcodes is the need for line-of-sight between the reader and the tag.

For applications where line-of-sight is not possible, systems not employing optical transmission have been developed. The most popular employ magnetic induction for coupling between the tag and the interrogator electronics, These typically operate with alternating magnetic fields in the frequency range of 50 kHz to 1 MHz, and generally employ integrated electronic circuits ("chips") to handle receive and transmit functions, and to provide data storage and manipulation. In order to avoid the need for a battery, power for the chip is obtained by rectification of the interrogating signal received by an antenna coil. In order to increase the power transferred, and to provide discrimination against unwanted signals and interference, the coil is usually resonated with a capacitor at the frequency of the interrogation signal carrier frequency. A typical product of this type is the TIRIS system manufactured by Texas Instruments Ltd.

Other multi-bit data tag systems have employed conventional h.f. radio technology, or technologies based on surface acoustic waves or magnetostriction phenomena.

The Invention

The present invention involves, inter alia, the use of a new type of passive data tag system which employs small amounts of very high-permeability magnetic material, and a scanned magnetic field for interrogation. Since the magnetic material can be in the form of a thin foil, wire or film, it can be bonded directly to a substrate, e.g. paper or a plastics material, to form self-supporting tags.

Alternatively, the magnetic material may be incorporated into the structure of an article with which the tag is to be associated; thus a tag may be formed in situ with the article in question by applying the magnetic material to the surface of the article, or by embedding the magnetic material within the body of the article.

The invention exploits magnetic fields which contain a "magnetic null"—this term is used herein to mean a point, line, plane or volume in space at or within which the component of the magnetic field in a given linear direction is zero. The volume in space over which this condition is met can be very small—and this gives rise to certain embodiments of the invention in which precise position is determined. Typically the magnetic null will be extant over a relatively small linear range. It should be understood that, where there is a magnetic null, it is possible (and is often the case) that the magnetic field component in a direction orthogonal to the given linear direction will be substantial. In some embodiments of this invention, such a substantial orthogonal field is desirable.

One way of creating the magnetic null is to employ opposing magnetic field sources. These may be current-carrying coils of wire, or permanent magnets (these being well suited to small-scale systems), or combinations of coil(s) and permanent magnet(s). It is also possible to exploit the magnetic nulls which exist in specific directions when a single coil or permanent magnet is used.

For large scale applications, the magnetic field sources are preferably coils carrying direct current.

The invention also utilises the relative movement between a magnetic marker and an applied magnetic field in order to effect passage over of the marker of the magnetic null. This can be achieved by moving the marker with respect to the applied magnetic field, or by holding the marker in a fixed position while the magnetic field is scanned over it. Generally, the invention exploits the difference between the magnetic behaviour of the marker in (i) a zero field (at the magnetic null), and (ii) in a high, generally saturating, magnetic field.

The magnetic basis of this invention is described more fully in WO96/31790, published Oct. 10, 1996, and incorporated herein by reference thereto.

Tags of this Invention

EAS tags are well known per se and are available in a variety of types from numerous manufacturers and suppliers. Some are permanently active in the sense that they are intended to activate an alarm if they pass through an interrogation zone (typically a gate near the exit of a store); such tags need to be removed at the checkout before the purchaser takes his goods out of the store. Other EAS tags carry a slightly more complex magnetic arrangement and are capable of being deactivated by means of a simple procedure (typically involving a high-field tool which the checkout operator uses to modify the magnetic properties of the tag); such deactivatable tags need not be removed from the articles prior to them leaving the store. This application will not describe the construction and operation of conventional EAS tags since this is well known in the art and is described extensively elsewhere.

The present invention is applicable to both types of EAS tag as described briefly above. It enables more detailed information to be obtained when an infringement of store security occurs; and it may also be used to provide more detailed information about the specific article to which the tag is attached when the article is processed at the point of sale.

According to one aspect of the present invention there is provided an electronic article surveillance tag which is characterised in that the or one of the magnetic materials on the tag is divided into distinct zones such that the zones and their relative positions can represent information or a code which is readable magnetically by passing the tag through a magnetic field which comprises a relatively small region of zero magnetic field (a magnetic null) contiguous with regions where the magnetic field is sufficient to saturate said magnetic material, the tag being moved through the magnetic field and its magnetic response being detected as it traverses the magnetic null.

This may be achieved by taking an existing EAS tag and utilising certain of its existing features and/or modifying it in a manner such as will be described below; or by fabricating special EAS tags which incorporate the features of this invention, e.g. by having a separate magnetic label mounted together with the EAS tag material on the same substrate.

The additional information available on the tag through the present invention can be used in a variety of ways, e.g.:

(i) to verify the precise type of EAS tag and its activation state;

(ii) to identify the category of goods, or more specific information relating to the goods, on which the tag is mounted; or (iii) to identify the outlet store from where the label originated, or the retail chain to which that store belongs.

This is of benefit in avoiding the embarrassment which can occur when a customer enters store A carrying goods purchased from store B, which goods unintentionally trigger the detection gate in store A as the customer leaves. Further benefits arise in stores where there is automatic shopping over a limited range of goods, and in identifying the class or category of a stolen item. The invention may also be used by manufacturers of EAS tags to provide unique features of their own choosing, e.g. to prevent their tags interfering with detection systems designed for other types of tag.

According to another aspect of the present invention there is provided a magnetic tag which is characterised in that the or one of the magnetic materials on the tag is divided into distinct zones such that the zones and their relative positions can represent information or a code which is readable magnetically by passing the tag through a magnetic field which comprises a relatively small region of zero magnetic field (a magnetic null) contiguous with regions where the magnetic field is sufficient to saturate said magnetic material, the tag being moved through the magnetic field and its magnetic response being detected as it traverses the magnetic null.

The distinct zones into which the or some of the magnetic material on the tag is divided may be physically spaced apart or they may be contiguous but rendered magnetically distinct by the presence of features such as indentions or scratches (whether continuous across the magnetic material or only in parts thereof). They may also be produced by overlaying the pre-existing magnetic material (e.g. of a Knogo 50 mm label) with an extra magnetic layer (such as described in WO96/31790) or by adding further magnetic material to the substrate carrying the EAS material.

Information may be encoded into tags in accordance with this invention by the techniques described in WO96/31790. The following specific techniques, as applied to different types of commercially available tags, are of interest:

1. Thin film tags (e.g. as described in U.S. Pat. No. 4,960,651)—typically as produced by Esselte Meto—may be adapted by putting scratches onto the thin film material in a predetermined manner so as to define a plurality of magnetically distinct zones. Preferably the scratches are at intervals of from 3 mm to 10 mm apart. The spacing between the scratches then defines the coding.

2. With deactivatable labels such as those produced by Esselte Meto, or Sensormatic J, or by Knogo, the intervals between the deactivator segments can be detected (using the detection systems as described in WO96/31790) when the tag is in both its active and deactivated state.

3. Acousto-magnetic labels (e.g. as supplied by Ultramax or PMR) can be used in this invention by variation of the magnetic bias pattern on the end of a few millimeters of the biasing magnet.

BRIEF DESCRIPTION OF THE DRAWINGS

For a better understanding of the invention, and to show how the same may be put into effect, reference will now be made, by way of example, to the accompanying drawing, in which:

Referring to FIG. 1, a generally square EAS tag 1 is shown. The tag is a "thin film tag" of the sort manufactured by Esselte Meto of Germany. The tag has been modified in accordance with this invention by the provision of scratches 2, 3, 4, 5 and 6; and of indents or "nicks" 7, 8 and 9. The relative positions of these features are given schematically. The spacing of scratches 2–6, measured from edge 10, is 3, 8, 13, 21 and 25 mm; again, these dimensions are given for purposes of illustration only. Actual spacings will be determined by those of ordinary skill in the art using their knowledge of the properties of the tag material and their intended use of the information storage of the finished tag. Each of the indents 7, 8 and 9 is 4 mm deep (perpendicular to edge 11). Normally a given tag will have either scratches (such as 2–6) or indentations (such as 7–9); both are shown in FIG. 1 for ease of illustration.

Referring now to FIG. 2, an EAS tag comprises a substrate 20 which supports an active EAS magnetic layer 21. An additional array 22 of high permeability magnetic zones is provided in accordance with this invention, the spacing between the individual zones 23, 24 and 25 serving to provide a means of coding for data storage. Although not shown in FIG. 2, the array 22 can be a two-dimensional array (see, for example, FIG. 9 of WO96/31790).

Figure 1:
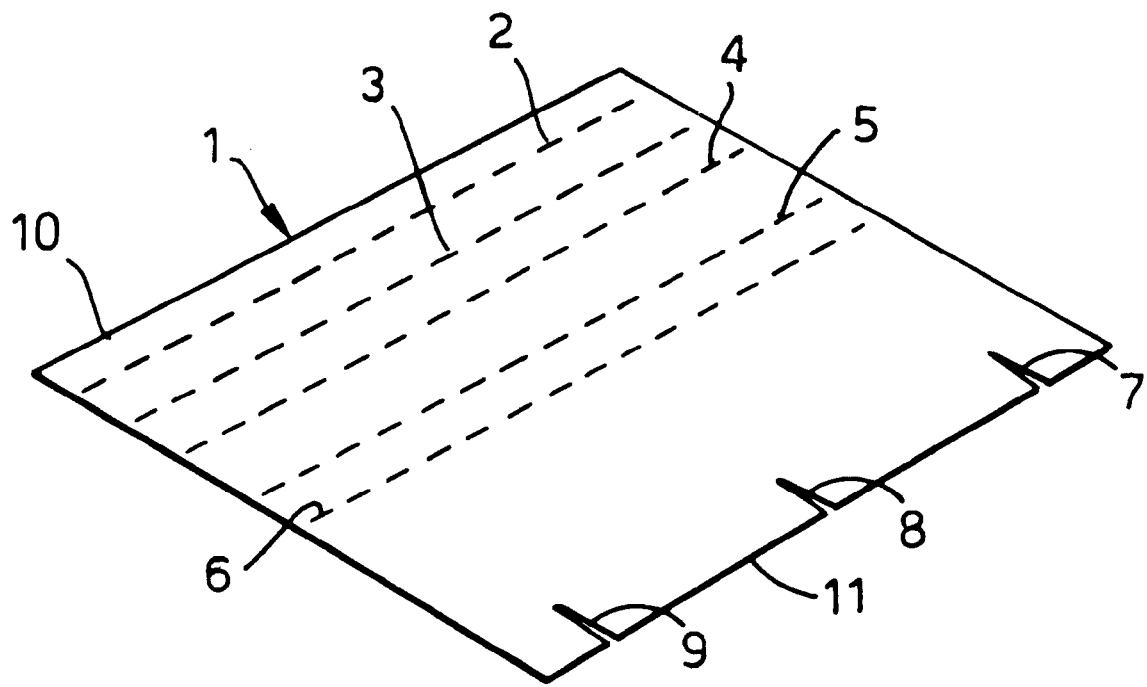
FIG. 1 shows one embodiment of tag in accordance with this invention.
Figure 2:
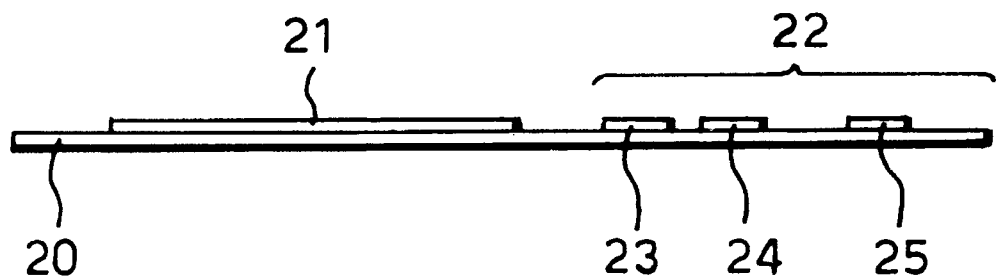
FIG. 2 shows a second embodiment of tag in accordance with this invention.

When a tag containing a piece of high-permeability magnetic material is passed along the coils axis through the region over which oscillation of the magnetic zero plane occur, it will initially be completely saturated by the DC magnetic field. It will next briefly be driven over its B-H loop as it passes through the zero field region. Finally it will become saturated again. The region over which the magnetic material is "active", i.e. is undergoing magnetic changes, will be physically small, and is determined by the amplitude of the DC field, the amplitude of the AC field, and the characteristics of the magnetic material. This region can easily be less than 1 mm in extent. If the level of the alternating field is well below that required to saturate the magnetic material in the tag, then harmonics of the AC signal will be generated by the tag as it enters the zero field region of interrogator field and responds to the changing field. As the tag straddles the narrow zero field region the tag will be driven on the linear part of its B-H loop, and will interact by re-radiating only the fundamental interrogation frequency. Then, as the tag leaves the zero field region, it will again emit harmonics of the interrogation field frequency. A receiver coil arranged to be sensitive to fields produced at the zero field region, but which does not couple directly to the interrogator coils, will receive only these signals. The variation of these signals with time as the tag passes along the coils axis gives a clear indication of the passage of the ends of the magnetic materials through the zero field region.

It will be appreciated that because the interrogator zone can be very narrow, each individual pieces of magnetic material can be distinguished from its neighbors, from which it is separated by a small distance. Naturally, the magnetic materials will be selected to suit the particular application for which the tag is intended. Suitable magnetic materials are commercially available.

If a tag containing a number of zones or pieces of magnetic material placed along the axis of the label is now considered, it will be appreciated that as each zone or piece of magnetic material passes through the zero-field region, its presence and the positions of its ends can be detected. It then becomes a simple matter to use the lengths and spacings of individual zones or pieces of magnetic materials to represent particular code sequences. Many different coding schemes are possible: one efficient arrangement is to use an analogue of the coding scheme used for optical barcodes, where data is represented by the spacing and widths of the lines in the code.

It will be appreciated that many other configurational possibilities exist within the scope of this invention.

What is claimed is:

1. An electronic article surveillance tag wherein a magnetic material on the tag is divided into distinct zones such that the zones and their relative positions represent information or a code which is readable magnetically by passing the tag through a magnetic field which comprises a relatively small region of zero magnetic field (a magnetic null) contiguous with regions where the magnetic field is sufficient to saturate said magnetic material, the tag being moved through the magnetic field and its magnetic response being detected as it traverses the magnetic null.

2. A tag as claimed in claim 1, characterised in that said distinct zones are formed by applying scratches to an otherwise continuous magnetic film.

3. A tag as claimed in claim 1, characterised in that said distinct zones are formed by applying indentations to an otherwise continuous magnetic film.

4. A tag as claimed in claim 1, characterised in that said distinct zones are formed by applying to the substrate carrying the active EAS magnetic material one or more additional areas of soft magnetic material.

5. A tag as claimed in claim 4, characterised in that said one or more additional areas are deposited on top of the existing magnetic material.

6. A tag as claimed in claim 4, characterised in that said one or more additional areas are deposited adjacent to the existing magnetic material.

7. A tag as claimed in claim 1, characterised in that the EAS tag is an acousto-magnetic tag and in that said distinct zones are formed by variation of the bias pattern at the end of the biasing magnet.

8. A magnetic information system comprising:

(a) a device further comprising distinct magnetic zones;

(b) a steady magnetic field comprising
a magnetic null region, and
a saturating field region closely adjacent thereto;

(c) a time-varying magnetic field superimposed on the steady magnetic field and being substantially spatially uniform over the magnetic null region; and (d) an interrogation device including a detector of induced magnetic fields produced by one of the magnetic zones passing through the magnetic null region;

whereby a motion of the tag through the magnetic null region produces a series of induced magnetic fields corresponding to an arrangement of the distinct magnetic zones on the tag along a direction of relative motion between the tag and the magnetic null region.

9. The system according to claim 8, wherein the magnetic null region is substantially planar and the direction of relative motion between the tag and the magnetic null region is generally perpendicular thereto.

10. The system according to claim 9, comprising opposed magnets creating the substantially-planar magnetic null region.

11. The system according to claim 10, wherein the opposed magnets comprise electromagnets.

* * * * *